US009568707B2

(12) United States Patent
Lee

(10) Patent No.: US 9,568,707 B2
(45) Date of Patent: Feb. 14, 2017

(54) SUSPENSION MECHANISM FOR AN OPTICAL IMAGE ANTI-SHAKE DEVICE

(75) Inventor: Jin Yu Lee, Tainan (TW)

(73) Assignee: TDK Taiwan Corp. (TW)

( * ) Notice: Subject to any disclaimer, the term of this patent is extended or adjusted under 35 U.S.C. 154(b) by 654 days.

(21) Appl. No.: 13/600,847

(22) Filed: Aug. 31, 2012

(65) Prior Publication Data
US 2013/0258475 A1  Oct. 3, 2013

(51) Int. Cl.
*G02B 27/64* (2006.01)
*G02B 7/10* (2006.01)
*G03B 3/10* (2006.01)
*G03B 5/00* (2006.01)

(52) U.S. Cl.
CPC ............ *G02B 7/102* (2013.01); *G02B 27/646* (2013.01); *G03B 3/10* (2013.01); *G03B 5/00* (2013.01); *G03B 2205/0015* (2013.01); *G03B 2205/0046* (2013.01); *G03B 2205/0053* (2013.01)

(58) Field of Classification Search
CPC ........................................ G02B 27/64–27/648
USPC .................................................. 359/554–557
See application file for complete search history.

(56) References Cited

U.S. PATENT DOCUMENTS

| | | | | |
|---|---|---|---|---|
| 5,589,239 | A | * | 12/1996 | Tomono ............... G02B 27/646 348/E5.046 |
| 5,844,719 | A | * | 12/1998 | Wada ............................. 359/557 |
| 2007/0035860 | A1 | * | 2/2007 | Adachi et al. ................. 359/824 |
| 2008/0031605 | A1 | * | 2/2008 | Akada et al. .................... 396/55 |
| 2010/0091120 | A1 | * | 4/2010 | Nagata ................. G02B 27/646 348/208.4 |
| 2011/0103782 | A1 | * | 5/2011 | Tsuruta .................. G02B 7/022 396/55 |
| 2012/0182436 | A1 | * | 7/2012 | Hu ...................... H04N 5/23287 348/208.99 |
| 2014/0376090 | A1 | * | 12/2014 | Terajima .............. G02B 27/646 359/557 |

* cited by examiner

*Primary Examiner* — Bumsuk Won
*Assistant Examiner* — Jeffrey Madonna

(57) ABSTRACT

An optical image anti-shake device, defined with an X-axis, a Y-axis and a Z-axis, includes a casing, a movable member and a base. A suspension mechanism furnished inside the optical image anti-shake device includes a movable-member support and a suspension module. A first surface of the movable-member support is connected to the movable member. The suspension module suspends the movable-member support together with the movable member inside an inner compartment formed between the casing and the base.

7 Claims, 16 Drawing Sheets

A-A section

A-A section

A-A section

B-B section

A-A section

SUSPENSION MECHANISM FOR AN OPTICAL IMAGE ANTI-SHAKE DEVICE

BACKGROUND OF INVENTION

1. Field of the Invention

The invention relates to a suspension mechanism for an optical image anti-shake device, by which the anti-shake strength of a lens module in the optical image anti-shake device can be increased to a degree that possible permanent deformation thereof can be avoided while in meeting an accidental fall.

2. Description of the Prior Art

Digital photography technology has been widely applied to most of the portable electronic devices such as the cellular phones. Various miniaturized techniques in the lens module are involved to make all these applications possible; in particular, the voice coil motor (VCM) technique. The VCM introduces a combination of coiled magnets and spring plates to drive a lens to move back and forth along a photo axis for image-capturing, so as to perform auto-zooming and/or auto-focusing of the lens module. Further, in this trend of demanding for devices capable of high-level photographing functions, photographic quality and various camera functions such as thousand pixels, anti-hand shake ability and so on are equipped to distinguish high-end camera from cost-down level.

In an optical system composed of a lens module and an image-compensation module, such as a camera system or a video recorder system, hand shake or some external situations usually occur to alter optical path so as to degrade the imaging upon the image-compensation module and further to obscure the formation of the images. A conventional resort to resolve this problem is to introduce a further compensation mechanism for overcoming possible shaking during the imaging. Such a compensation mechanism can be either digital or optical.

State of the art digital compensation mechanism is to analyze and process the digital imaging data capturing by the image-compensation module, so as to obtain a clearer digital image. Such a mechanism is also usually called as a digital anti-shake mechanism. On the other hand, the optical compensation mechanism, usually called as an optical anti-shake mechanism, is to add a shake-compensation module upon the lens module or the image-compensation module. Currently, most of the optical anti-shake mechanisms in the market are consisted of plenty complicated or cumbersome components and thus are usually complicatedly structured, difficultly assembled, expensive, and hard to be further miniaturized. Obviously, a further improvement upon such the anti-shake mechanism is definitely necessary.

Referring to FIG. 1, an optical compensation mechanism in accordance with the Japan Patent No. 2002-207148 is schematically shown. The optical compensation mechanism includes four flexible steel strings $400k$-$403k$ to sustain a lens unit $203k$ upon a circuit board $301k$ having a central image sensor $300k$. The lens unit $203k$ further includes a lens $200k$ and a lens holder $202k$. The lens unit $203k$ can be a zooming or a focusing lens module. The lens $200k$ centrally located in the lens unit $203k$ can move back and forth with respect to the lens holder $202k$ along an optical axis $201k$. While in meeting a shake, a relative displacement between the lens unit $203k$ and the circuit board $301k$ would be generated. Then, through two relative displacement sensors $500k$, $501k$ and a position sensor $503k$, both the X-axial displacement and the Y-axial displacement between the lens unit $203k$ and the circuit board $301k$ can be transmitted to an anti-shake unit $504k$. According to the axial displacements, the anti-shake unit $504k$ controls and drives a shift unit $502k$ to perform a corresponding compensation movement upon the lens unit $203k$ with respect to the circuit board $301k$, such that obscure imaging due to the shake can be avoided in the image sensor $300k$.

Nevertheless, the aforesaid Japanese patent is only a conceptual disclosure aiming at obscure imaging by hand-shaking. Details carried to a real practice are yet to be elucidated. Contrarily, the present invention herein is to integrate the Japanese concept and the auto-focusing module to provide a reality design that can react to the X-axial and Y-axial bias and avoid a possible Z-axial (same along the optical axis) permanent (plastic) deformation of the lens unit $203k$ due to accidental falls; such that an enhanced anti-shake capability against accidental falls can be provided to the concerned optical system.

SUMMARY OF THE INVENTION

Accordingly, it is the primary object of the present invention to provide a suspension mechanism for an optical image anti-shake device, in which a suspension structure is introduced to avoid possible permanent (plastic) deformations of the optical lens module along an optical axis (Z axis) due to accidental falls.

In the present invention, the optical image anti-shake device to carry the suspension mechanism is defined with an X-axis, a Y-axis and a Z-axis, and includes a casing, a movable member and a base. The suspension mechanism furnished inside the optical image anti-shake device includes a movable-member support and a suspension module. A first surface of the movable-member support is connected to the movable member. The suspension module suspends the movable-member support together with the movable member inside an inner compartment formed between the casing and the base. By providing the suspension mechanism to the optical image anti-shake device, unexpected Z-axial displacements leading to a permanent damage upon the movable member restrained by the movable-member support can be avoided, while in meeting an accidental fall or a violent impact.

All these objects are achieved by the suspension mechanism for an optical image anti-shake device described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a suspension mechanism for an optical image anti-shake device. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
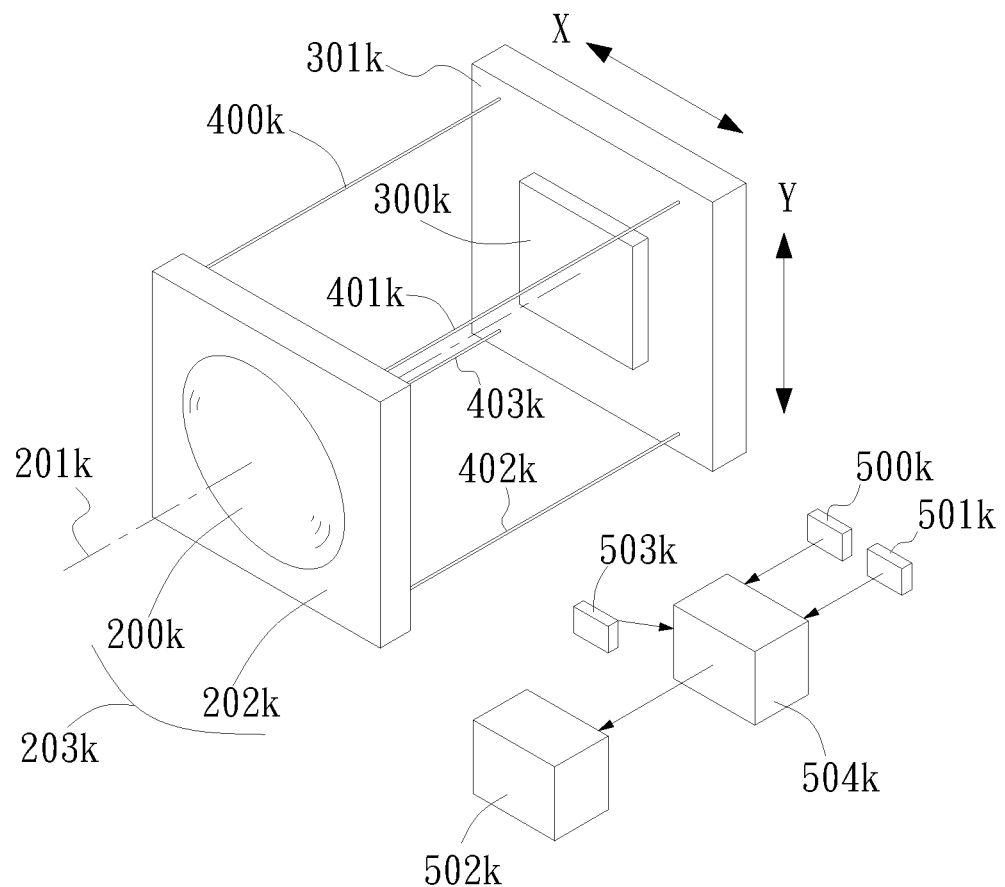
FIG. 1 shows explodedly the Japan Patent No. 2002-207148.
Figure 2:
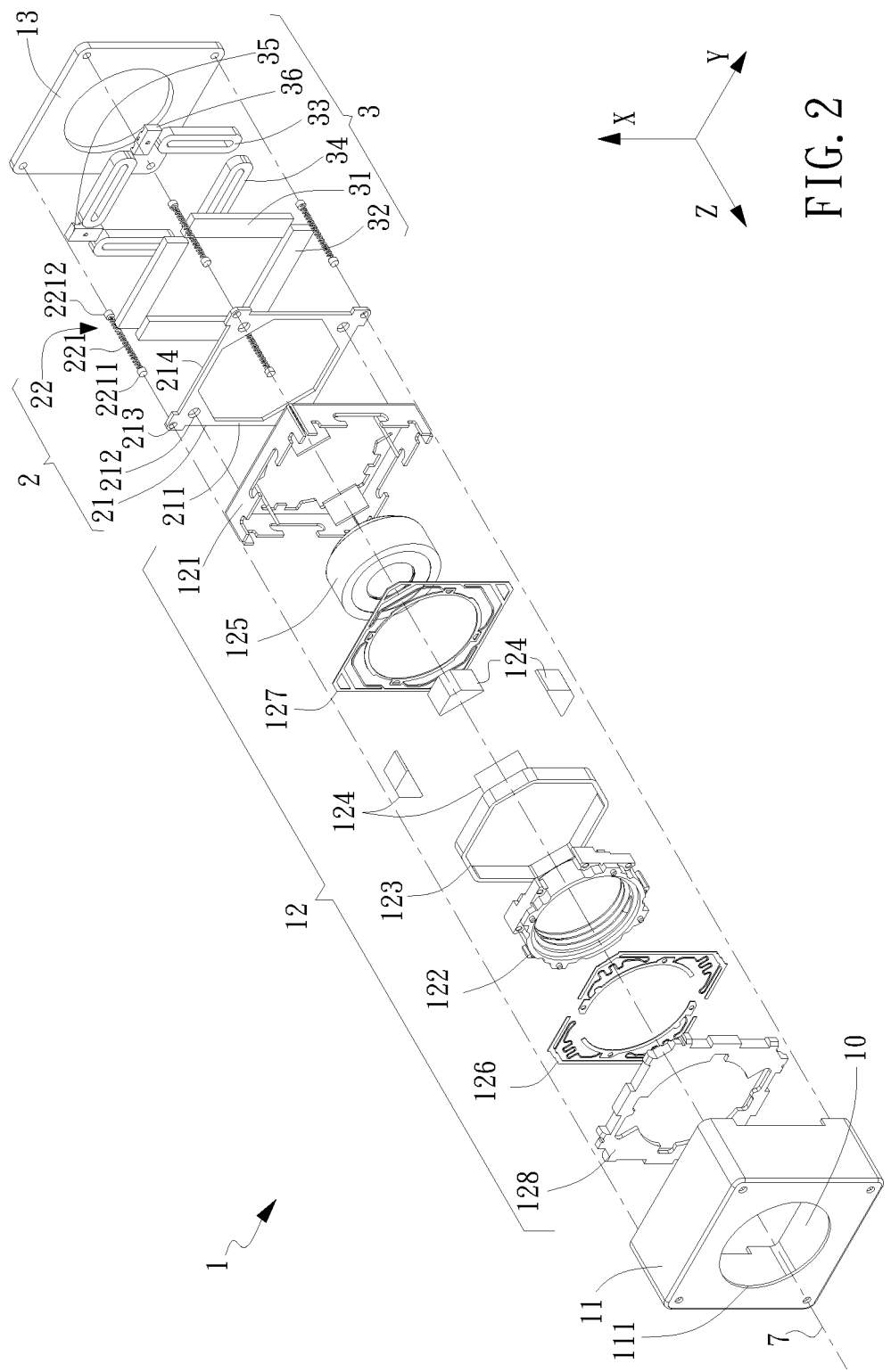
FIG. 2 is a schematic exploded view of an optical image anti-shake device having a first embodiment of the suspension mechanism in accordance with the present invention.
Figure 3:
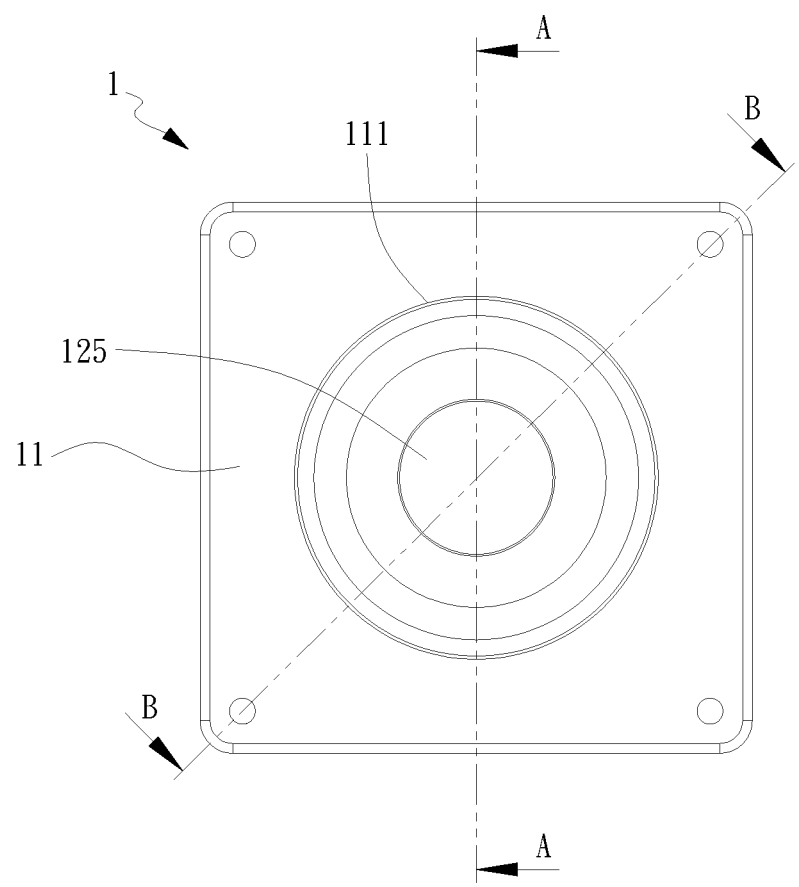
FIG. 3 is a top view of FIG. 2.
Figure 4:
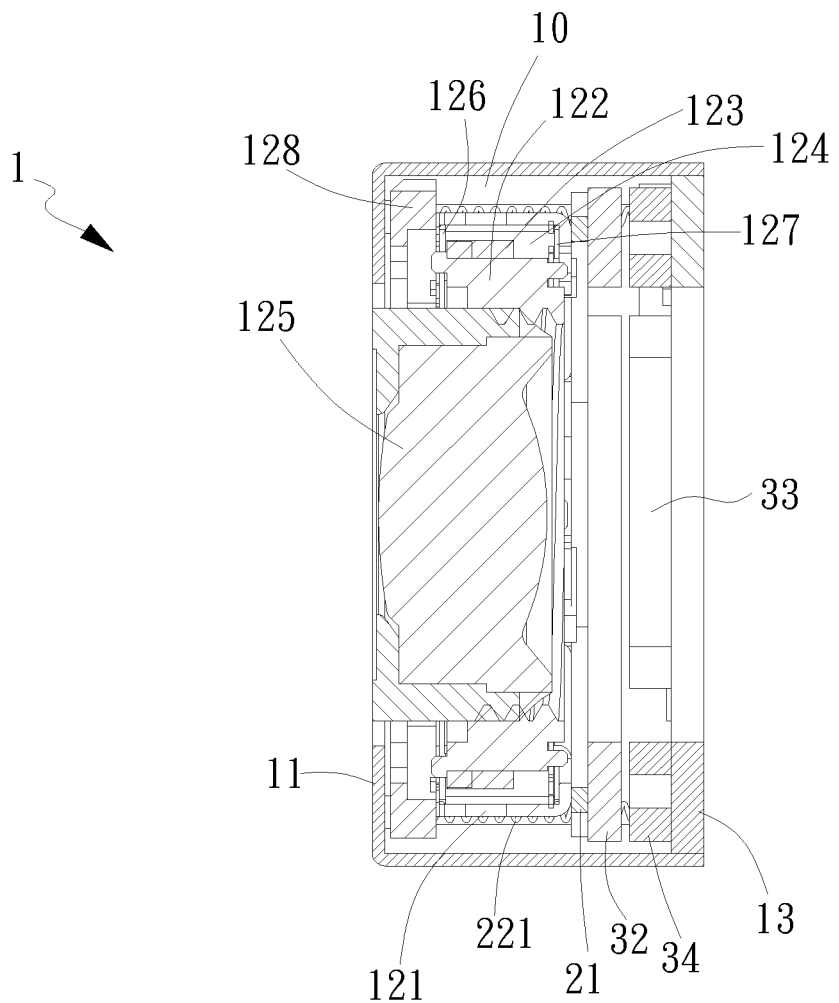
FIG. 4 is a cross-sectional view of FIG. 3, along line A-A.
Figure 5:
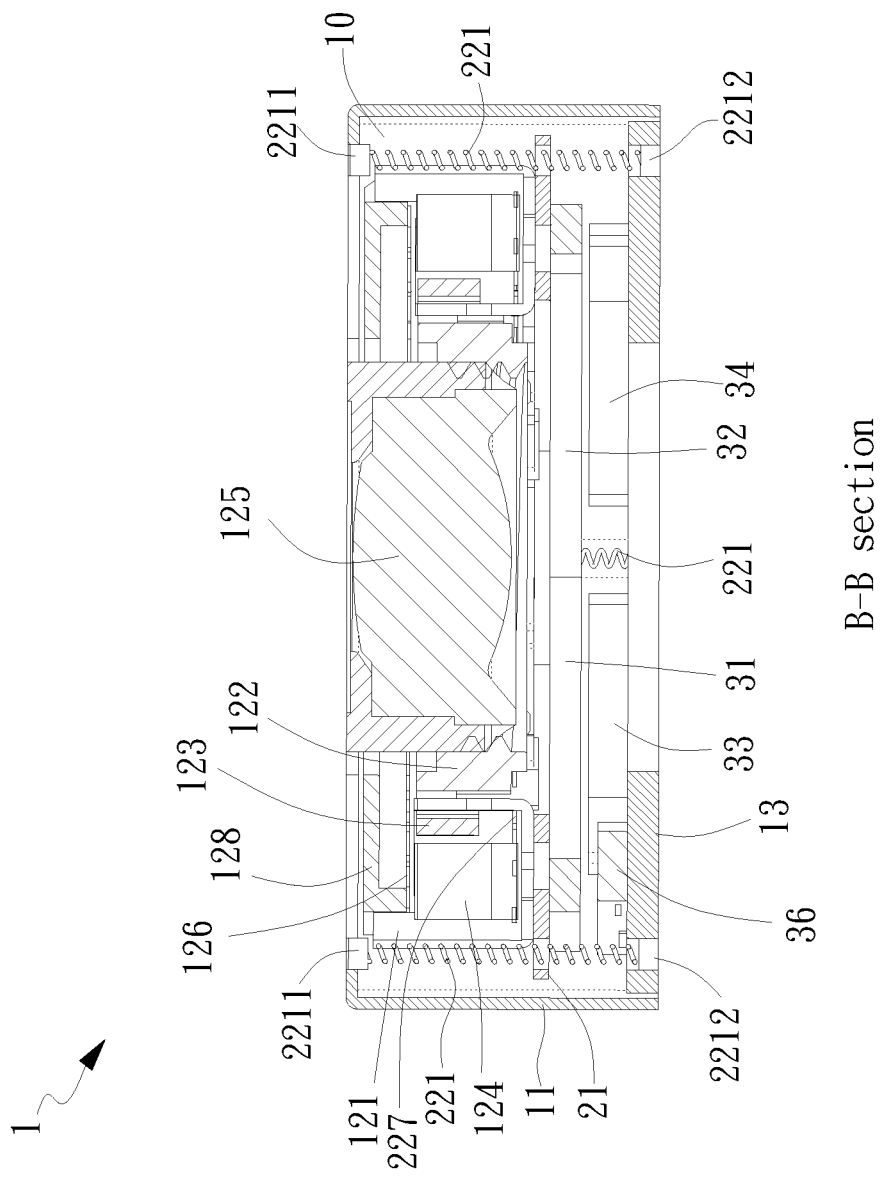
FIG. 5 is a cross-sectional view of FIG. 3, along line B-B.
Figure 6:
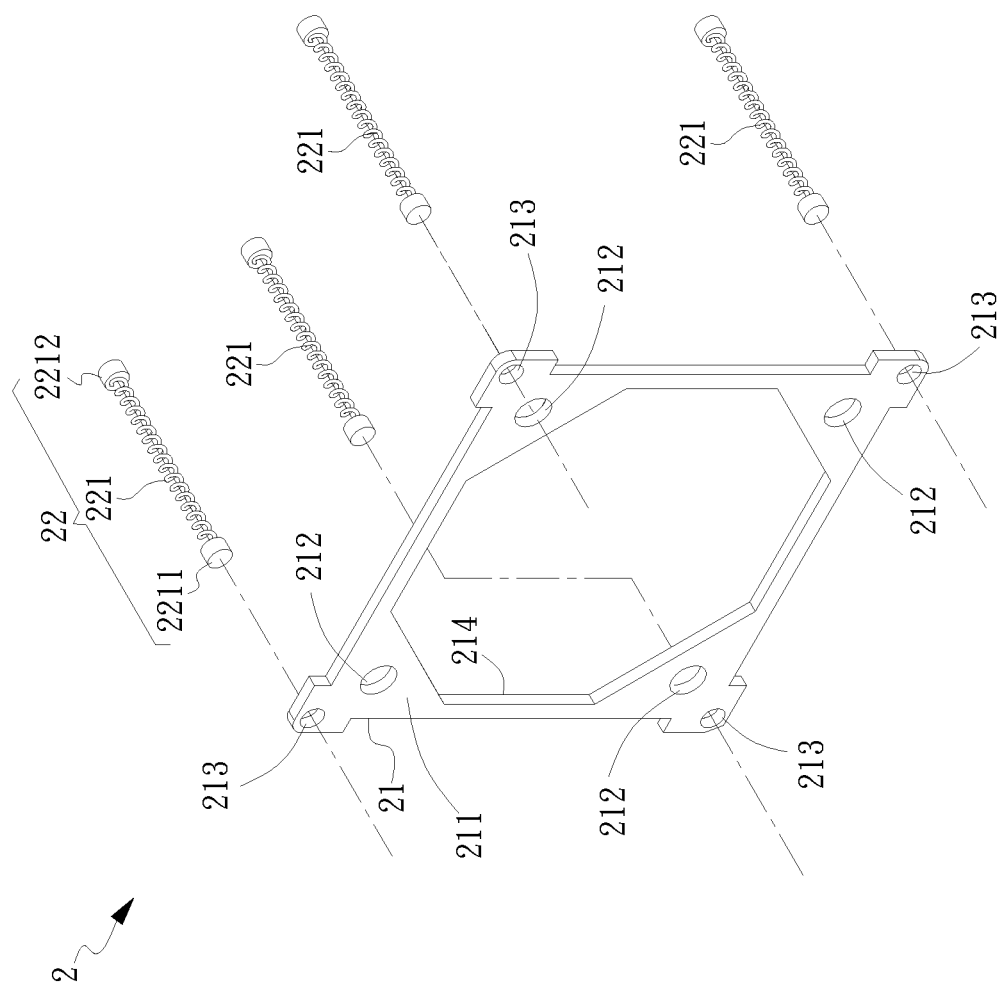
FIG. 6 is an enlarged exploded view of the suspension mechanism of FIG. 2.

Refer now to FIG. 2, FIG. 3, FIG. 4, FIG. 5 and FIG. 6, in which FIG. 2 is a schematic exploded view of an optical image anti-shake device having a first embodiment of the suspension mechanism in accordance with the present invention, FIG. 3 is a top view of FIG. 2, FIG. 4 is a cross-sectional view of FIG. 3 along line A-A, FIG. 5 is a cross-sectional view of FIG. 3 along line B-B, and FIG. 6 is an enlarged exploded view of the suspension mechanism of FIG. 2.

In the present invention, the optical image anti-shake device 1 to carry the first embodiment of the suspension mechanism 2 is defined with an orthogonal coordinate system having an X-axis, a Y-axis and a Z-axis. The optical image anti-shake device 1 includes a casing 11, a movable member 12 and a base 13. The suspension mechanism 2 furnished inside the optical image anti-shake device 1 includes a movable-member support and a suspension module 22. A first surface 211 of the movable-member support 21 is adhered to the movable member 12 inside the device 1. As shown, in this embodiment 2, an appropriate number of openings 212 are preset at the first surface 211 for serving a weight-saving purpose. The suspension module 22 suspends the movable member 12 engaged at the movable-member support 21 inside an inner compartment 10 formed between the casing 11 and the base 13. By providing the suspension mechanism 2 to the optical image anti-shake device 1, unexpected Z-axial displacements leading to a permanent deformation upon the movable member 12 and the base 13 can thus be avoided, while in meeting an accidental fall or a severe impact. In addition, by providing a compensation module 3 inside the inner compartment 10, X-axial and Y-axial deviations of the movable member 12 after the accidental fall or the impact can be amended so as to achieve the invention object in anti-shaking. In practice, the Z-axial elastic coefficient of the movable member 12 carried by the suspension module 22 should be higher than each of the X-axial elastic coefficient and the Y-axial elastic coefficient thereof; such that permanent deformation or damage at the connection of the suspension mechanism 2 and the movable member 12 can be avoided while the movable member 12 meets a Z-axial impact, and also optical performance of the lens 125 inside the movable member 12 can be ensured without negative influence by unexpected Z-axial displacements at the suspension mechanism 2 due to a strength problem under normal operations. In particular, the movable member 12 in this embodiment carried by the suspension module 22 should have the Z-axial elastic coefficient at least 50 times larger than either the X-axial elastic coefficient or the Y-axial elastic coefficient. Preferably, the largest displacement of the movable member 12 should be low enough not to be interfered by an instant tolerance between the movable member 12 and the base 13.

The suspension module 22 includes a plurality (four in the figure) of elastic elements 221 extended longitudinally along directions parallel to the Z axis at the rim of the movable-member support 21. Each of the elastic elements 221 has a first connection end 2211 and an opposing second connection end 2212 for connecting the movable member 12 in a suspension manner respectively to the casing 11 and the base 13. Namely, with each of the four corner elastic elements 221 to connect to one respective fixation position 213 at a corresponding corner of the movable-member support 21 by either penetration, welding, or adhesion, the movable member 12 carried by the movable-member support 21 can then be suspended in the inner compartment 10 between the casing 11 and the base 13. For example, as shown in FIGS. 2 and 6, each fixation position 213 can be but not limited to a fixation hole which is penetrated through by a corresponding elastic element 221 and is fixedly connected to a middle portion of the elastic element 221. Upon such an arrangement, sufficient buffering rooms for compensating unexpected impacts can be provided to the movable member 12. In the present invention, the elastic element 221 can be one of metal springs (such as but not limited to: lengthy and thin spiral springs as shown in FIGS. 2 and 6), metal spring plates, plastic springs and poly elastomers.

In the first embodiment of the present invention as shown in FIG. 6, the movable-member support 21 is a hollow plate structure having the first surface 211 for holding the movable member 12, a plurality of openings 212, a plurality of fixation positions 213 for hanging fixedly the suspension module 22, and the second surface 214 opposing to the first surface 211. In particular, the elastic elements 221 are four lengthy spiral springs made of appropriate metals or other relevant materials and extend parallel to the Z axis with an equilibrium arrangement to connect to four corners of the movable-member support 21 via the respective fixation positions 213. In addition, the first connection end 2211 of each the elastic element 221 is connected to a top place inside the casing 11, while the second connection end 2212 is connected to the base 13. Also, the movable-member support 21 is fixed in a middle portion of each elastic element 221. Thereby, the movable member 12 can be elastically suspended inside the inner compartment 10 by the four elastic elements 221. Thus, to the movable member 12 as well as the movable-member support 21, both X-axial and Y-axial displacement tolerances can be provided, and also slight Z-axial displacement tolerance, or say the buffering room, can be obtained. Accordingly, sufficient Z-axial impact strength can be provided to the movable member 12 so as to meet unexpected challenges from accidental falls of the optical system.

In the first embodiment of the present invention, the movable member 12 can be an auto-focusing module (typically named to the movable member 12 in the following description) or an auto-zooming module having a lens 125 defined with a photo axis 7 parallel to the Z axis. Of course, in the present invention, the movable member 12 can be also an ordinary lens module without any automation function. The surface of the auto-focusing module 12 is substantially parallel to the X-Y plane. The suspension module 22 is to hang the auto-focusing module 12 in a suspension manner and to maintain substantially the Z-axial arrangement of the casing 11, the auto-focusing module 12 and the base 13 along the same photo axis 7. Through a penetration hole 111 on the casing 11, the auto-focusing module 12 can perform image capturing of external objects.

In this first embodiment of the present invention, the auto-focusing module 12 includes a base frame 121, a lens carrier 122, a coil 123, at least a magnet 124 (four shown in FIG. 2), a lens 125, an upper spring plate 126, a lower spring plate 127 and an upper cover 128. Preferably, the auto-focusing module 12 can include a VCM. Also, along the photo axis 7 (parallel to the Z axis), the lens carrier 122 carrying the lens 125 is mounted inside the base frame 121 of the auto-focusing module 12. The coil 123 is to surround exteriorly the lens carrier 122 at a position corresponding to the respective magnet 124 (one or plural) mounted at the inner rim of the base frame 121; such that the magnet 124 and the coil 123 can form a VCM electromagnetic driving module for driving the lens carrier 122 as well as the lens 125 to move linearly with respect to the base frame 121 along the photo axis 7. By providing different input currents to the coil 123, different magnetic fields in between with the magnet 124 can be formed to energize the lens carrier 122 to move back and forth along the photo axis 7 so as to achieve the zooming or focusing purpose. The lens carrier 122 mounted inside the base frame 121 is elastically clamped by respective inner elastic ribs of the upper spring plate 126 and the lower spring plate 127, in which the upper spring plate 126 is fixed to the lens carrier 122 at a position between the upper cover 128 and the lens carrier 122 and the lower spring plate 127 is located inside the base frame 121 at another position between the base frame 121 and the lens carrier 122. The upper spring plate 126 and the lower spring plate 127 are thin elastic hollow plates made of appropriate metallic materials, and can be produced by a stamping process, an etching process, an electro-discharging process, a laser cutting, or any the like. The upper cover 128 is engaged with the base frame 121 so as to form in between an allowable motion space for the lens carrier 122 to move thereinside. In this first embodiment, though the combination of the upper spring plate 126 and the lower spring plate 127 is preferably introduced to also define directionally the allowable motion space for the lens carrier 122 in an elastic clamping manner, yet it should be understood that, in other embodiments not shown herein, the conventional roller pair and/or the screw rod can also be feasible alternatives to replace the aforesaid combination in defining the allowable motion space of the lens carrier 122.

The compensation module 3, located at the photo axis 7 between the movable member 12 and the base 13, is to compensate possible impact-induced deviations of the movable member 12 at the X-axial and Y-axial directions. The compensation module 3 as shown in FIG. 2 further includes at least one X-axial magnet 31 (two shown in the figure), at least one Y-axial magnet 32 (two shown in the figure), at least one X-axial magnet-driving coil 33 (two shown in the figure), at least one Y-axial magnet-driving coil 34 (two shown in the figure), an X-axial displacement sensor 35, and a Y-axial displacement sensor 36.

The aforesaid two X-axial magnets 31 and the two Y-axial magnets 32 are respectively mounted onto the second surface 214 of the movable-member support 21. As shown in FIG. 2, the two parallel Y-axial magnets 32 and the two parallel X-axial magnets 31 are paired to form a magnetic square on the second surface 214. On the other hand, the two parallel Y-axial magnet-driving coils 34 and the two parallel X-axial magnet-driving coils 33 are paired to form another coil square on the base 13 at a position in facing the magnetic square by having the X-axial magnets 31 and the Y-axial magnets 32 to account for the X-axial magnet-driving coils 33 and the Y-axial magnet-driving coils 34, respectively.

The X-axial displacement sensor 35 and the Y-axial displacement sensor 36 are both located on the base 13 to detect the X-axial deviation and the Y-axial deviation of the movable member 12, respectively. In the present invention, the X-axial displacement sensor 35 and the Y-axial displacement sensor 36 can be magnetic sensors, optical sensors, and/or other conventional displacement sensors. For the magnetic sensors, the Hall sensors, the magneto-resistive (MR) sensors, the fluxgate sensors, and the like can be applicable. For the optical sensor, the optical position detectors, the optical encoders and the like can be applicable. In the case that the X-axial displacement sensor 35 and the Y-axial displacement sensor 36 are both magnetic sensors, the X-axial displacement sensor 35 can be located on the base 13 at a position corresponding to one of the two X-axial magnets 31, and the Y-axial displacement sensor 36 can be located on the base 13 at another position corresponding to one of the two Y-axial magnets 32. In the case that the X-axial displacement sensor 35 and the Y-axial displacement sensor 36 are both optical sensors, corresponding reflection surfaces shall be structured to the movable member 12 at appropriate places either at the base frame 121 or at the movable-member support 21. In this first embodiment, the X-axial displacement sensor 35 and the Y-axial displacement sensor 36 are both magnetic sensors, and thus the X-axial displacement sensor 35 and the Y-axial displacement sensor 36 are located on the base 13 at positions appropriately accounting for one of the two X-axial magnets 31 and one of the two Y-axial magnets 32, respectively; such that the deviations in the X-axial magnets 31 and the Y-axial magnets 32 can be individually detected. Upon the aforesaid arrangement, the flexibility provided by the elastic elements 221 provides both the gravity supports and the X-axial/Y-axial displacement corrections for the auto-focusing module 12. Namely, as the X-axial displacement sensor 35 and the Y-axial displacement sensor 36 locate horizontal shake-induced deviations between the auto-focusing module 12 and the base 13, the coils 33, 34 mounted on the base 13 are energized to drive the corresponding magnets 31, 32 mounted on the movable-member support 2 of the auto-focusing module 12 so as to compensate and thereby correct the X-axial and the Y-axial deviations of the auto-focusing module 12 perpendicular to the photo axis 7. Thereupon, the object of the present invention in anti-hand shaking for obtaining better imaging can be thus achieved.

In the first embodiment of the present invention shown in FIG. 2 thru FIG. 6, the compensation module 3 of the suspension mechanism for the optical image anti-shake device is preferably embodied as a dynamic electromagnetic compensation module. Yet, in other embodiments not shown herein, the compensation module 3 can be also embodied as a piezoelectric module, a pneumatic module, or any the like. Further, the positions for the magnets 31, 32 and the pairing coils 33, 34 are not strictly limited to the aforesaid places. Actually, any position that can provide precise detection of the deviations is relevant for the magnetic pairs of the present invention. For example, switching the positions of the magnets and the pairing coils for the first embodiment is also acceptable to the setup of the present invention.

In the following description, two more embodiments of the present invention are present. For most of the elements of the following embodiments are resembled to those of the first embodiment as described above, the same names and numbers would be directly assigned to those elements that have been described in the first embodiment. For those elements of the following two embodiments that are slightly different to the corresponding elements in the first embodiment, a tailing English letter will be added to the respective numbers though the same names and numbers are still given. Details for those elements of the following two embodiments that are totally resembled to or slightly different to the corresponding elements in the first embodiment are omitted herein.

Figure 7:
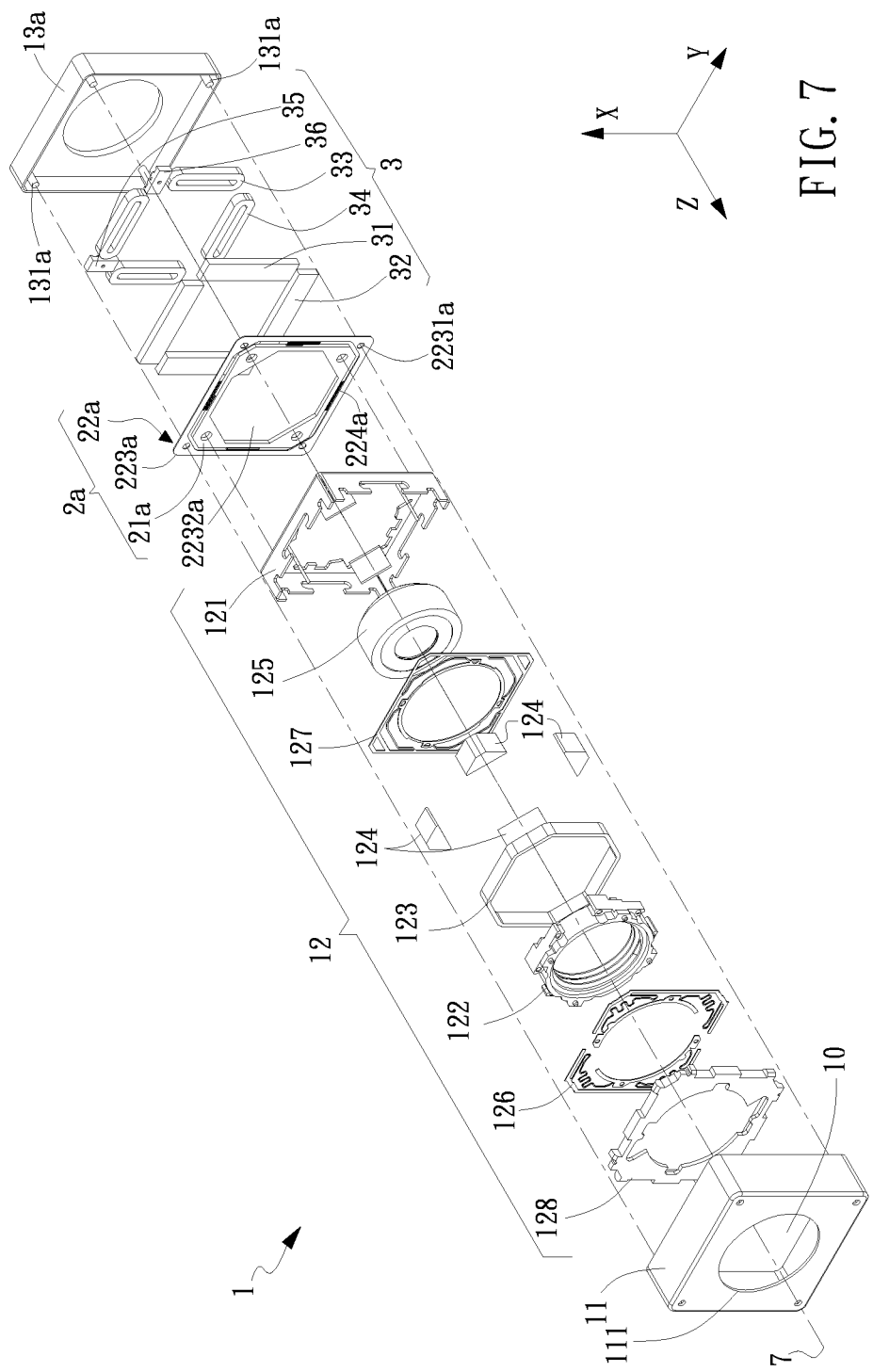
FIG. 7 is a schematic exploded view of an optical image anti-shake device having a second embodiment of the suspension mechanism in accordance with the present invention.
Figure 8:
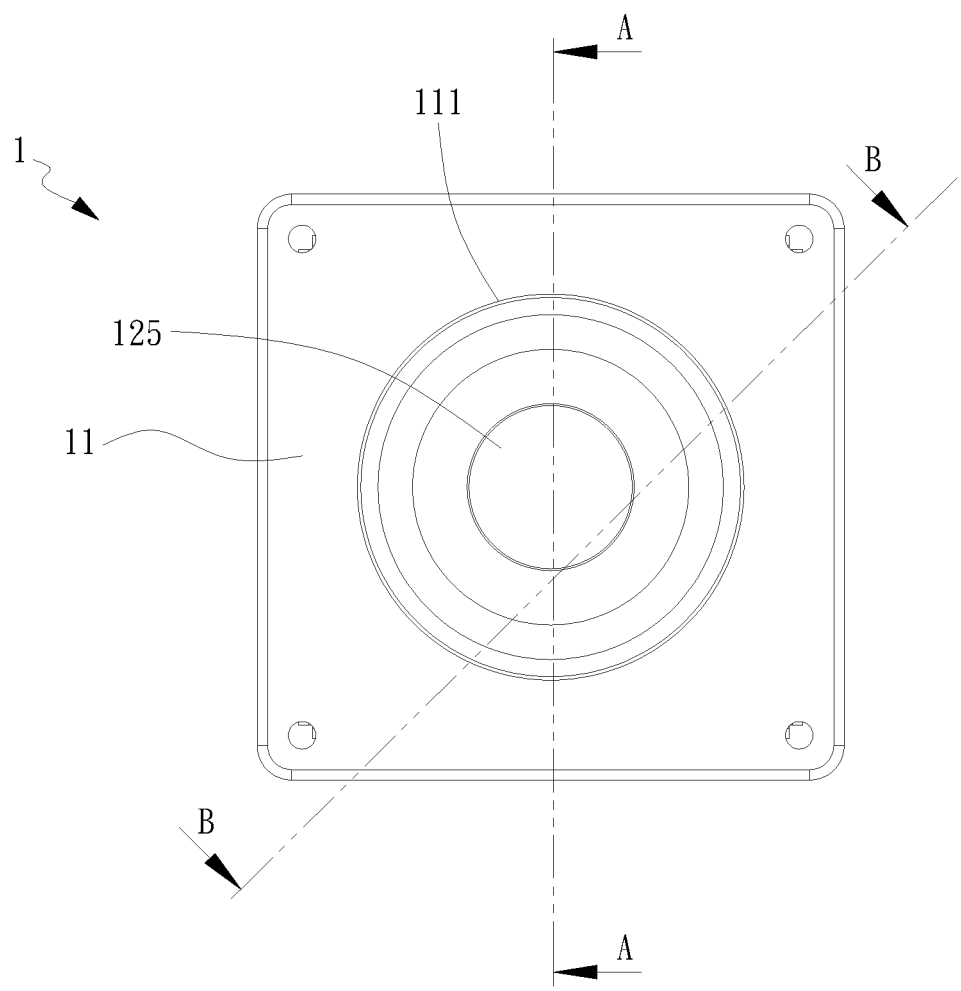
FIG. 8 is a top view of FIG. 7.
Figure 9:
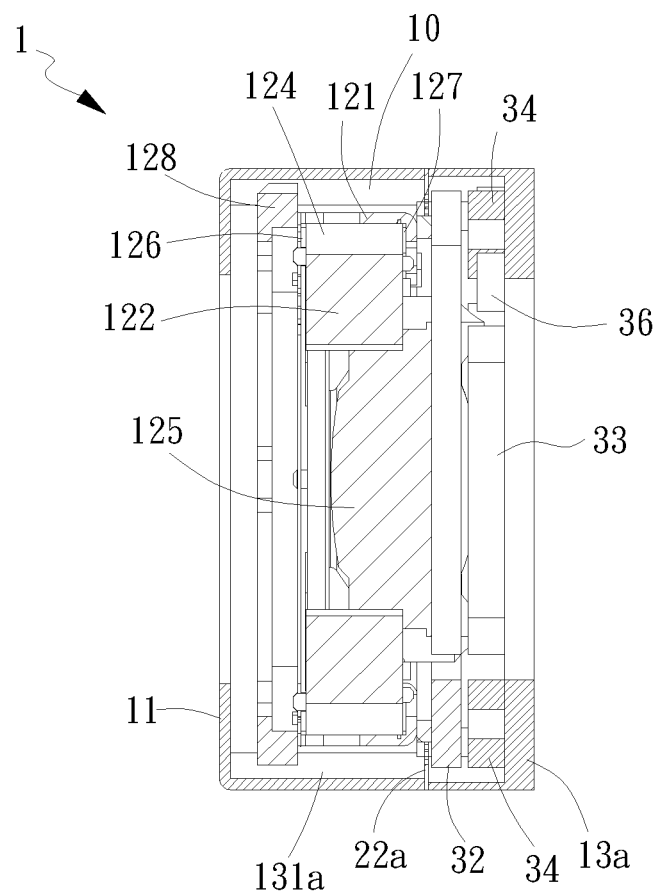
FIG. 9 is a cross-sectional view of FIG. 8, along line A-A.
Figure 10:
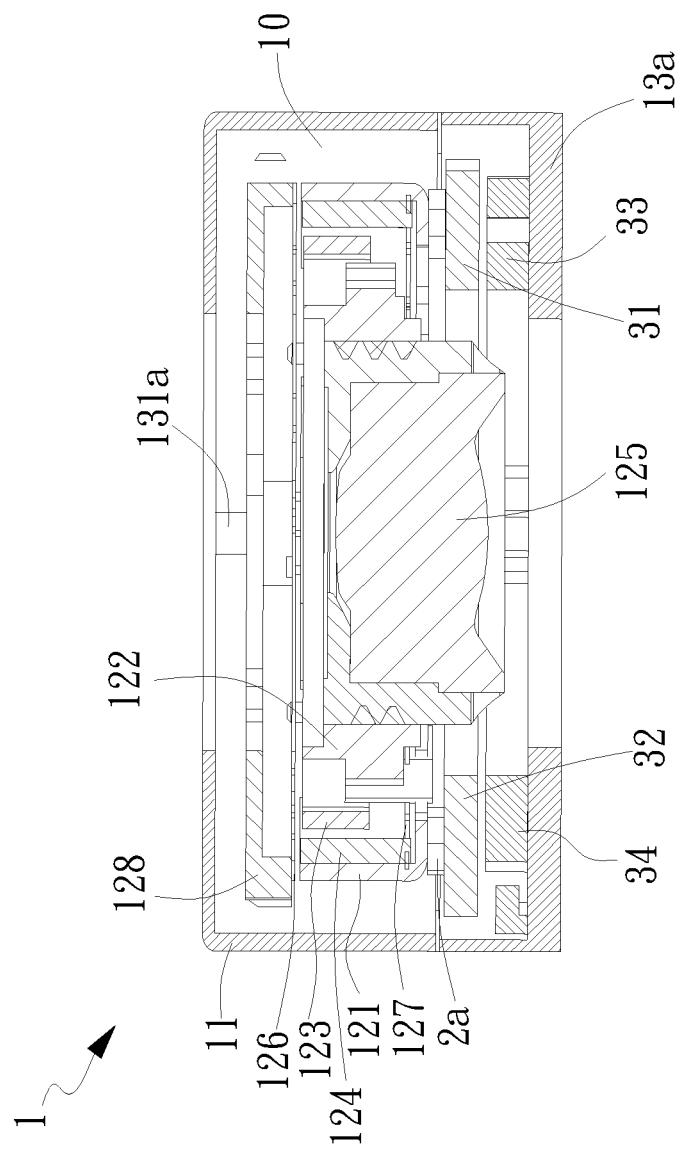
FIG. 10 is a cross-sectional view of FIG. 8, along line B-B.
Figure 11:
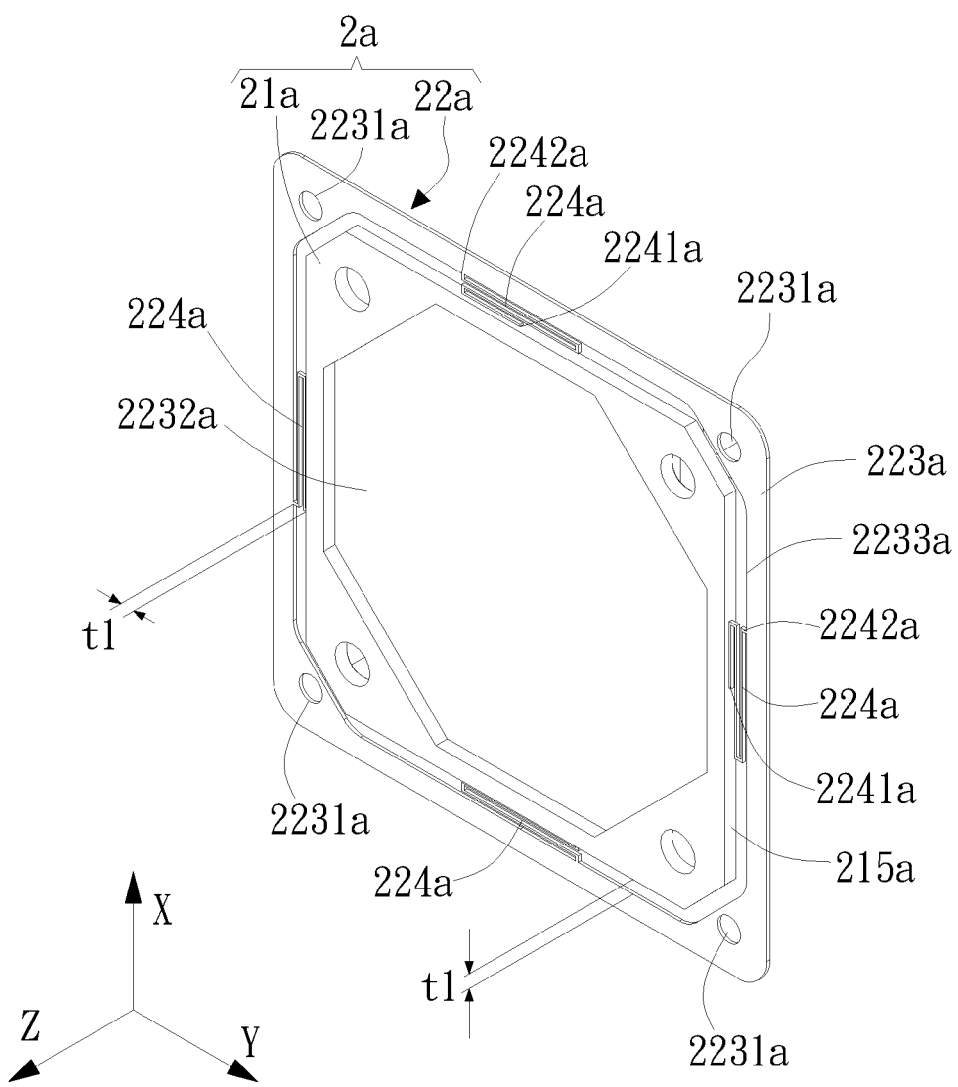
FIG. 11 is an enlarged exploded view of the suspension mechanism of FIG. 7.

Refer now to FIG. 7, FIG. 8, FIG. 9, FIG. 10 and FIG. 11, in which FIG. 7 is a schematic exploded view of an optical image anti-shake device having a second embodiment of the suspension mechanism in accordance with the present invention, FIG. 8 is a top view of FIG. 7, FIG. 9 is a cross-sectional view of FIG. 8 along line A-A, FIG. 10 is a cross-sectional view of FIG. 8 along line B-B, and FIG. 11 is an enlarged exploded view of the suspension mechanism of FIG. 7. For the second embodiment of the suspension mechanism shown from FIG. 7 thru FIG. 11 is largely resembled to the first embodiment shown from FIG. 2 thru FIG. 6, details for the common elements in between would be omitted.

As shown, the major difference between the second embodiment and the first embodiment in accordance with the present invention is that the suspension mechanism 2a of the second embodiment includes a movable-member support 21a and a suspension module 22a, in which the suspension module 22a further includes a frame 223a and a plurality of elastic elements 224a. The frame 223a is substantial a hollow square plate having four lateral sides and four corners. Each of the four corners of the frame 223a has a fixation position 2231a for forming a fixation pair with a fixation protrusion 131a located at the respective corner of the base 13a. In another embodiment not shown herein, the fixation between the frame 223a and the base 13a can also be done by other relevant means different to the aforesaid fixation pair of the fixation position 2231a (such like but not limited to a fixation hole) and the fixation protrusion 131a. Those relevant means may be an adhesive means or an engaging pair. In particular, the frame 223a and the movable-member support 21a can be integrated as a unique piece.

In the second embodiment, the movable-member support 21a and the frame 223a are both thin-plate structures having individual upper surfaces parallel to the X-Y plane. Preferably, the movable-member support 21a and the frame 223a are located at the same X-Y plane and have almost the same thickness. In particular, the movable-member support 21a, the elastic elements 224a and the frame 223a are produced as a single piece from stamping the same thin metal plate. The frame 223a has a central hollow portion 2232a for receiving the movable-member support 21a. A surrounding gap with preset spacing t1 exists between the inner movable-member support 21a and the outer frame 223a. The elastic elements 224a are mounted in an equilibrium manner in the surrounding gap t1 to space the frame 223a and the movable-member support 21a. Each of the elastic elements 224a has a first end 2241a and an opposing second end 2242a to connect with an outer rim 215a of the movable-member support 21a and an inner rim 2233a of the frame 223a, respectively. Upon such an arrangement, the auto-focusing module 12 engaged at the movable-member support 21a can be elastically suspended inside the central hollow portion 2232a of the frame 223a. By providing the elastic elements 224a to elastically hold the auto-focusing module 12, an impact-absorbing buffering mechanism can be formed to further avoid possible impact-induced deformation at the Z-axial direction. Further, through the compensation module 3, deviations at the X-axial and the Y-axial directions can be also corrected.

In the second embodiment of the present invention, the elastic elements 224a are four elements mounted inside the gap t1 to surround equally and exteriorly the movable-member support 21a in a perpendicular way to the Z-axial direction. Preferably, the four elastic elements 224a include a pair of parallel X-axial elements and a pair of parallel Y-axial elements. Each of the elastic elements 224a has a Z-axial elastic coefficient larger than its X-axial and Y-axial elastic coefficients. In the present invention, the elastic element 224a can be embodied as one of the following: a single string structure extended along the X-axial or Y-axial direction, an elastic structure having S-shape winding portions, an elastic structure having helix spring portions, a metal spring, a metal spring plate, a plastic spring or a poly elastomer.

Figure 12:
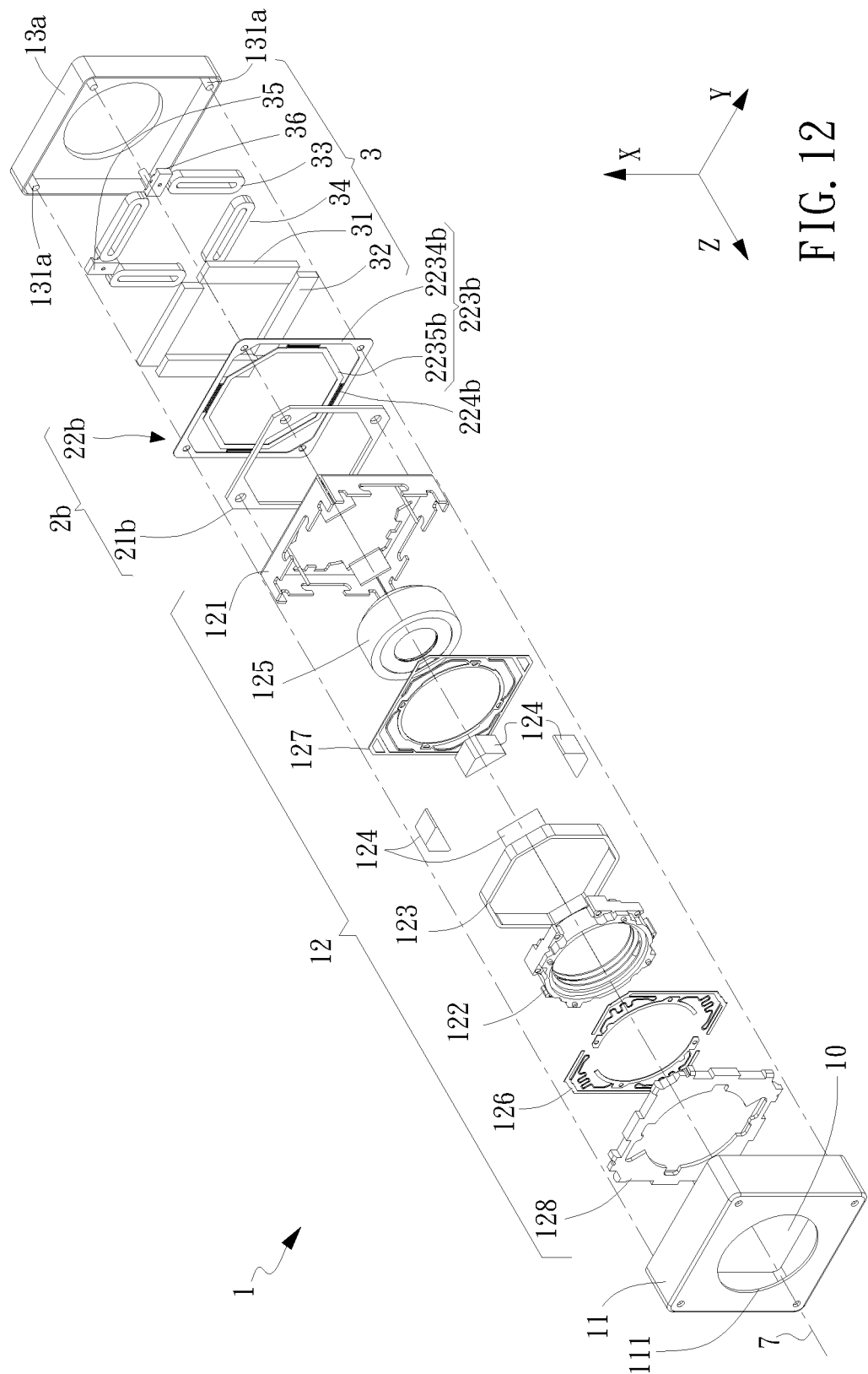
FIG. 12 is a schematic exploded view of an optical image anti-shake device having a third embodiment of the suspension mechanism in accordance with the present invention.
Figure 13:
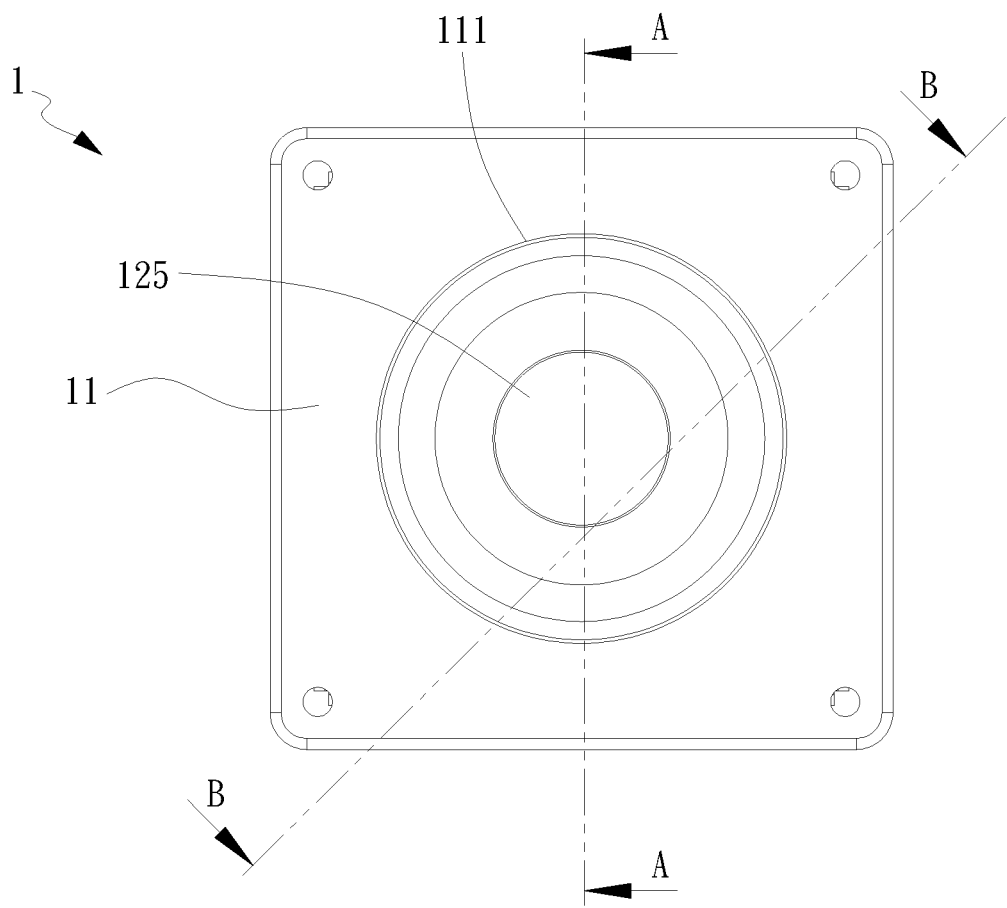
FIG. 13 is a top view of FIG. 12.
Figure 14:
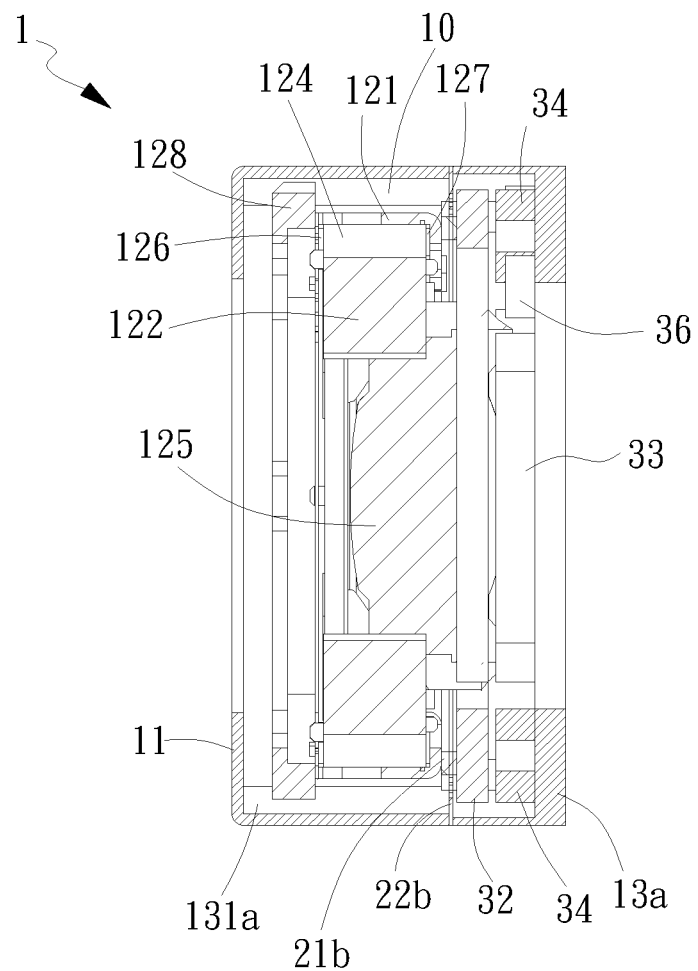
FIG. 14 is a cross-sectional view of FIG. 13, along line A-A.
Figure 15:
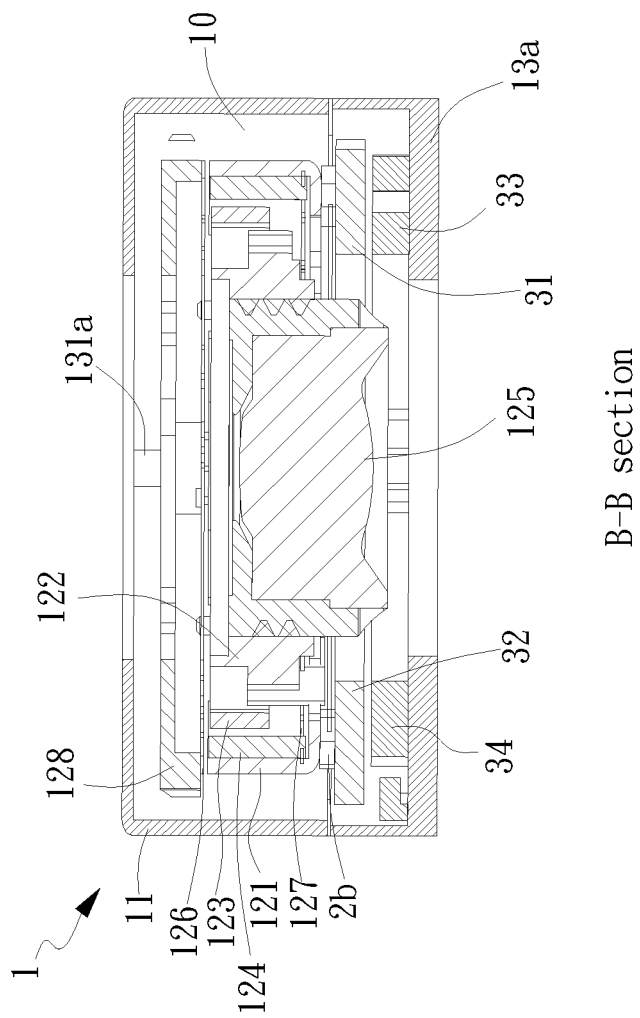
FIG. 15 is a cross-sectional view of FIG. 13, along line B-B.
Figure 16:
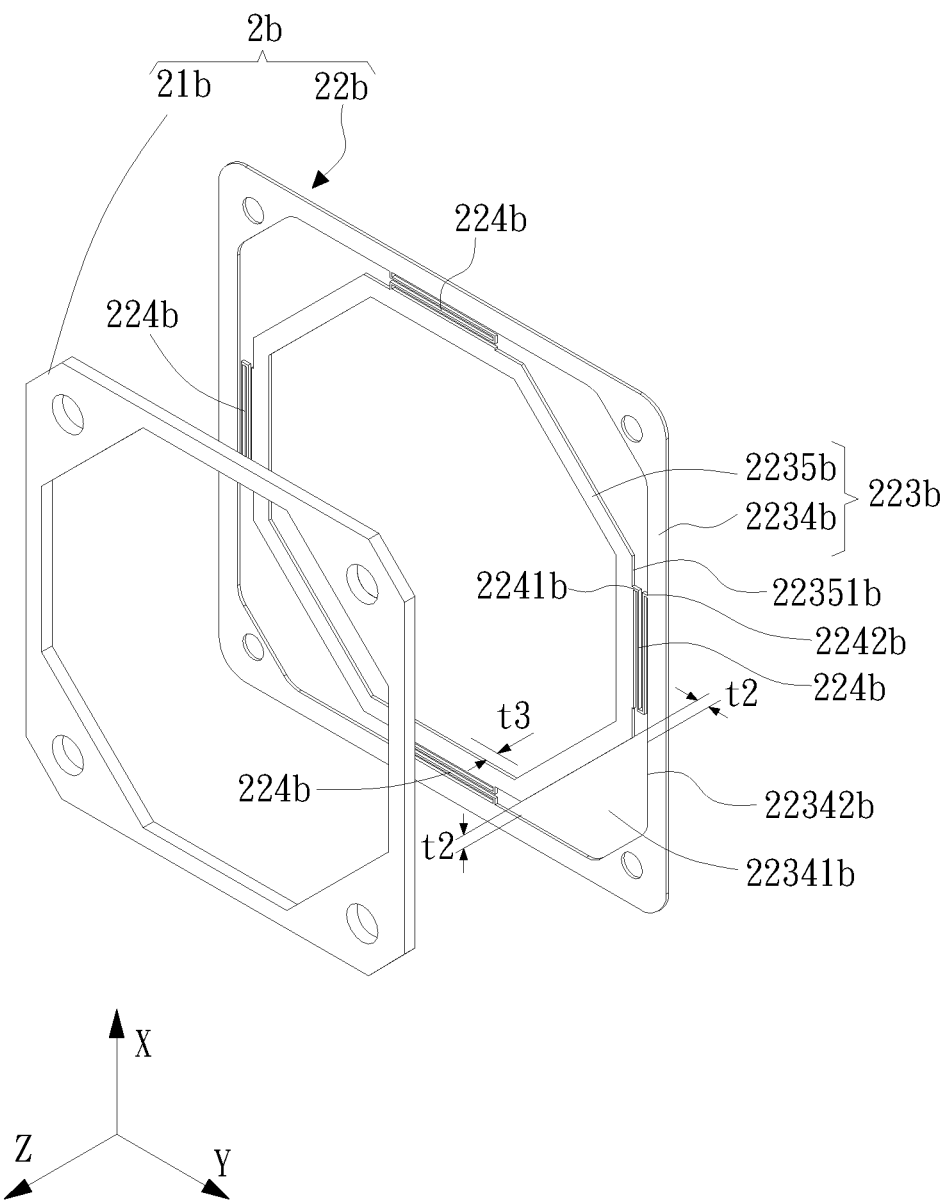
FIG. 16 is an enlarged exploded view of the suspension mechanism of FIG. 12.

Refer now to FIG. 12, FIG. 13, FIG. 14, FIG. 15 and FIG. 16, in which FIG. 12 is a schematic exploded view of an optical image anti-shake device having a third embodiment of the suspension mechanism in accordance with the present invention, FIG. 13 is a top view of FIG. 12, FIG. 14 is a cross-sectional view of FIG. 13 along line A-A, FIG. 15 is a cross-sectional view of FIG. 13 along line B-B, and FIG. 16 is an enlarged exploded view of the suspension mechanism of FIG. 12. For the third embodiment of the suspension mechanism shown from FIG. 12 thru FIG. 16 is largely resembled to the second embodiment shown from FIG. 7 thru FIG. 11, details for the common elements in between would be omitted.

As shown, the major difference between the third embodiment and the second embodiment in accordance with the present invention is that the suspension mechanism 2b of the third embodiment includes a movable-member support 21b and a suspension module 22b, in which the suspension module 22b further includes a frame 223b and a plurality of elastic elements 224b. The frame 223b further includes an outer frame portion 2236b and an inner frame portion 2235b. The inner frame portion 2235b is located in a central hollow portion 22341b of the outer frame portion 2234b. A gap with a preset spacing t2 exists to space the outer frame portion 2234b and the inner frame portion 2235b. A first end 2241b and an opposing second end 224b of the individual elastic element 224b are connected to an outer rim 22351b of the inner frame portion 2235b and an inner rim 22342b of the outer frame portion 2234b, respectively. The inner frame portion 2235b is further fixed to the movable-member support 21b, such that the auto-focusing module 12 can be thereby suspended in the center portion of the outer frame portion 2234b of the frame 223b.

In the third embodiment, by adhering, screwing, inserting or any relevant fixation means the like, the movable-member support 21b can be fixed to the surface of the inner frame portion 2235 so as to have the auto-focusing module 12 engaged fixedly at the movable-member support 21b to suspend within the central hollow portion 22341b of the outer frame portion 2234b. The elastic elements 224b are four elements mounted inside the gap t2 to surround equally and peripherally the movable-member support 21b in a perpendicular way to the Z-axial direction. Preferably, the four elastic elements 224b include a pair of parallel X-axial elements and a pair of parallel Y-axial elements. Upon such an arrangement, the auto-focusing module 12 can then be equipped with anti-impact capability so as to prevent from Z-axial deformations and further to amend possible X-axial and Y-axial deviations by introducing the compensation module 3. As shown in FIG. 16, the inner frame portion 2235b of the frame 223b in the third embodiment 2b can integrate the elastic elements 224b to form a spring mechanism, and further the inner frame portion 2235b can also contribute to compensate X and Y directional displacements within a t2 range and to allow a t3 tolerance for the Z directional displacement. It is noted that the t3 is the Z-axial buffer spacing between the magnets 31, 32 and the inner frame portion 2235b.

Conclusively, the optical image anti-shake device 1 of the present invention, defined with an X-axis, a Y-axis and a Z-axis, includes a casing 11, a movable member (auto-focusing module) 12 and a base 13. The suspension mechanism 2 provided inside to the optical image anti-shake device 1 includes a movable-member support 21 and a suspension module 22. A first surface 211 of the movable-member support 21 has a plurality of preset openings 212 for mounting the movable member (auto-focusing module) 12 of the optical image anti-shake device 1. The suspension module 22 suspends the movable-member support 21 together with the movable member 12 inside an inner compartment 10 formed between the casing 11 and the base 13. Upon such an arrangement, the suspension mechanism 2 in accordance with the present invention can prevent the movable member (auto-focusing module) 12 from permanent Z-axial deformations due to unexpected impacts or falls, and also a compensation module 3 inside the inner compartment 10 can be introduced to amend the impact-induced X-axial and/or Y-axial deviations of the movable member 12. Thereby, the anti-shake capability can then be equipped to the optical device.

While the present invention has been particularly shown and described with reference to a preferred embodiment, it will be understood by those skilled in the art that various changes in form and detail may be without departing from the spirit and scope of the present invention.

What is claimed is:

1. A suspension mechanism installed inside an optical image anti-shake device, the optical image anti-shake device defined with an X-Y-Z orthogonal coordinate system and having a casing, a movable member and a base, the casing having a front end, the suspension mechanism comprising:
    a movable-member support, formed as a hollow plate structure having a first surface thereof for holding the movable member, a plurality of openings and a plurality of fixation positions; and
    a suspension module, located between the casing and the base, being hanged fixedly by the plurality of fixation positions of the movable-member support so as to suspend the movable-member support together with the movable member inside an inner compartment formed between the casing and the base, the suspension module allowing the movable member to displace with respect to the base along an X-axial direction and a Y-axial direction and also allowing the movable member to shift at a Z-axial direction, wherein the suspension module further includes a plurality of elastic elements extending individually along directions parallel to the Z-axial direction with an equilibrium arrangement to connect to four corners of the movable-member support via the respective fixation positions and connecting to movable-member support, each of the elastic elements having thereof a first connection end and an opposing second connection end to connect respectively with the casing and the base so as to fix the movable-member support in a middle portion thereof with the movable-member support being closer to the base than the front end of the casing, such that the movable-member support is suspended perpendicular to the Z-axial direction inside the inner compartment by the plurality of elastic elements;
    wherein a photo axis is parallel to the Z-axial direction;
    wherein the suspension module is to hang the movable member in a suspension manner and to maintain substantially a Z-axial arrangement of the casing, the movable member and the base along the same photo axis.

2. The suspension mechanism according to claim 1, wherein each said elastic element is one of metal springs, metal spring plates, plastic springs and poly elastomers.

3. The suspension mechanism according to claim 1, wherein each said elastic element is located to a respective fixation position at a corresponding corner of said movable-member support by either penetration, welding, or adhesion.

4. The suspension mechanism according to claim 1, wherein said optical image anti-shake device includes a compensation module, and the compensation module further includes:
    two X-axial magnets, mounted parallel on a second surface of said movable-member support;
    two Y-axial magnets, mounted parallel on the second surface of said movable-member support in a manner to form a magnet square with the two X-axial magnets;
    two X-axial magnet-driving coils, mounted parallel on said base at places opposite to the two X-axial magnets respectively;
    two Y-axial magnet-driving coils, mounted parallel on said base at places opposite to the two Y-axial magnets respectively and in a manner to form a coil square with the two X-axial magnet-driving coils;
    an X-axial displacement sensor, located on said base to detect an X-axial deviation of said movable member; and
    a Y-axial displacement sensor, located on said base to detect a Y-axial deviation of said movable member.

5. The suspension mechanism according to claim 4, wherein each of said X-axial displacement sensor and said Y-axial displacement sensor is one of a magnetic sensor and an optical sensor; the magnetic sensor being one of a Hall sensor, a magneto-resistive (MR) sensor and a fluxgate sensor, the optical sensor being one of an optical position detector and an optical encoder;
    wherein, in the case that the X-axial displacement sensor and the Y-axial displacement sensor are both magnetic sensors, the X-axial displacement sensor is located on said base at a position corresponding to one of the two X-axial magnets, and the Y-axial displacement sensor is located on said base at another position corresponding to one of the two Y-axial magnets;
    wherein, in the case that the X-axial displacement sensor and the Y-axial displacement sensor are both optical sensors, the X-axial displacement sensor and the Y-axial displacement sensor are located on the base at respective places to face said movable member.

6. The suspension mechanism according to claim 1, wherein said movable member is defined with an optical axis and further includes:

a base frame;

a lens carrier, mounted inside the base frame;

a coil, mounted to surround exteriorly the lens carrier;

at least one magnet, mounted at an inner rim of the base frame with respect to the coil, said at least one magnet and said coil being integrated to form an electromagnetic driving module for driving the lens carrier to move linearly with respect to the base frame along the photo axis;

a lens, mounted at the photo axis inside the lens carrier;

an upper cover, engaged with the base frame so as to form in between an allowable motion space for the lens carrier to move thereinside;

an upper spring plate, fixed to the lens carrier at a position between the upper cover and the lens carrier; and a lower spring plate, located inside the base frame to elastically clamp the lens carrier with the upper spring plate.

7. The suspension mechanism according to claim 1, wherein the movable-member support is spaced apart from both said ends of each said elastic element and is also movable relative to both said ends of each said elastic element.

\* \* \* \* \*